(12) United States Patent
Lehmann

(10) Patent No.: US 8,720,298 B2
(45) Date of Patent: May 13, 2014

(54) DEVICE FOR MOVING AND POSITIONING AN OBJECT IN SPACE

(75) Inventor: Christian Lehmann, Radolfszell (DE)

(73) Assignee: Robert Bosch GmbH, Stuttgart (DE)

( * ) Notice: Subject to any disclaimer, the term of this patent is extended or adjusted under 35 U.S.C. 154(b) by 840 days.

(21) Appl. No.: 12/736,616

(22) PCT Filed: Apr. 1, 2009

(86) PCT No.: PCT/EP2009/053854
§ 371 (c)(1),
(2), (4) Date: Oct. 22, 2010

(87) PCT Pub. No.: WO2009/130115
PCT Pub. Date: Oct. 29, 2009

(65) Prior Publication Data
US 2011/0033275 A1     Feb. 10, 2011

(30) Foreign Application Priority Data
Apr. 22, 2008  (DE) .................. 10 2008 001 314

(51) Int. Cl.
*B25J 17/02*   (2006.01)
*B25J 9/16*    (2006.01)
*B25J 19/00*   (2006.01)

(52) U.S. Cl.
CPC .......... *B25J 17/0266* (2013.01); *B25J 17/0283* (2013.01); *B25J 9/1623* (2013.01); *B25J 19/0041* (2013.01); *Y10S 414/13* (2013.01); *Y10S 901/29* (2013.01)
USPC ............. 74/490.06; 74/490.02; 74/490.03; 74/490.05; 414/735; 901/29; 414/917

(58) Field of Classification Search
CPC ............. B25J 17/0266; B25J 17/0283; B25J 17/0291; B25J 19/0041; B25J 9/1623; Y10S 414/13
USPC ................. 74/490.2, 490.3, 490.05, 490.06; 403/735, 109.1, 109.7; 414/735; 901/29
See application file for complete search history.

(56) References Cited

U.S. PATENT DOCUMENTS 4,683,912 A *  8/1987  Dubrosky ............ 137/580
4,802,815 A    2/1989  Funabashi et al.
(Continued)

FOREIGN PATENT DOCUMENTS

EP    1129829 A1    9/2001
FR    2647763 A1    12/1990
(Continued)

*Primary Examiner* — Saul Rodriguez
*Assistant Examiner* — Brendan Tighe
(74) *Attorney, Agent, or Firm* — Michael Best & Friedrich LLP

(57) ABSTRACT

The invention relates to a device for moving and positioning an object in space, having at least three actuator arms each connected to a motor/drive unit and pivotable about a motor/drive axis. The free end of each actuator arm is jointedly connected by connecting rods to a support element having at least one gripping device that can be connected to a vacuum source via a vacuum hose. The gripping device is provided with a suction opening for suctionally gripping the object. According to the invention, the vacuum hose is guided by the support element to the motor/drive axis of one of the motor/drive units, and can be connected to the vacuum source by a rotatable hose joint disposed substantially in the motor/drive axis and rotatable about the motor/drive axis.

8 Claims, 3 Drawing Sheets

(56) References Cited

U.S. PATENT DOCUMENTS

| | | | | |
|---|---|---|---|---|
| 5,488,215 | A * | 1/1996 | Aronsson | 219/86.25 |
| 6,543,987 | B2 * | 4/2003 | Ehrat | 414/735 |
| 6,577,093 | B1 * | 6/2003 | Hvittfeldt et al. | 318/568.11 |
| 6,766,711 | B2 * | 7/2004 | Hvittfeldt et al. | 74/490.05 |
| 6,840,127 | B2 * | 1/2005 | Moran | 74/490.04 |
| 6,896,473 | B2 * | 5/2005 | Schuler | 414/729 |
| 7,013,915 | B2 * | 3/2006 | Businaro et al. | 137/580 |
| 7,173,213 | B2 * | 2/2007 | Inoue et al. | 219/125.1 |
| 7,188,544 | B2 * | 3/2007 | Persson et al. | 74/490.03 |
| 7,419,351 | B2 * | 9/2008 | Nihei et al. | 414/735 |
| 7,422,412 | B2 * | 9/2008 | Akaha | 414/744.5 |
| 7,513,174 | B2 * | 4/2009 | Harada et al. | 74/490.06 |
| 7,597,025 | B2 * | 10/2009 | Narita et al. | 74/490.02 |
| 7,836,789 | B2 * | 11/2010 | Haniya et al. | 74/490.06 |
| 8,020,466 | B2 * | 9/2011 | Inoue et al. | 74/490.02 |
| 8,020,467 | B2 * | 9/2011 | Haniya et al. | 74/490.02 |
| 8,113,083 | B2 * | 2/2012 | Breu | 74/490.01 |
| 8,117,939 | B2 * | 2/2012 | Burlot | 74/490.02 |
| 8,134,324 | B2 * | 3/2012 | Nishida et al. | 318/568.21 |
| 8,307,732 | B2 * | 11/2012 | Kinoshita et al. | 74/490.01 |
| 8,454,258 | B2 * | 6/2013 | Sendai et al. | 403/38 |
| 2001/0019692 | A1 * | 9/2001 | Ehrat | 414/735 |
| 2003/0064816 | A1 * | 4/2003 | Schuler | 464/102 |
| 2003/0121350 | A1 * | 7/2003 | Hvittfeldt et al. | 74/490.01 |
| 2004/0143876 | A1 * | 7/2004 | Persson et al. | 901/1 |
| 2005/0139270 | A1 * | 6/2005 | Businaro et al. | 137/580 |
| 2005/0281660 | A1 * | 12/2005 | Nihei et al. | 414/735 |
| 2006/0000817 | A1 * | 1/2006 | Inoue et al. | 219/125.1 |
| 2006/0117896 | A1 * | 6/2006 | Kidooka et al. | 74/490.02 |
| 2006/0182602 | A1 * | 8/2006 | Schuler et al. | 414/735 |
| 2006/0182603 | A1 * | 8/2006 | Hawes | 414/735 |
| 2007/0000894 | A1 * | 1/2007 | Klein | 219/137.9 |
| 2007/0208458 | A1 * | 9/2007 | Harada et al. | 700/245 |
| 2008/0199281 | A1 * | 8/2008 | Ogliari et al. | 414/217 |
| 2008/0257092 | A1 * | 10/2008 | Nihei et al. | 74/479.01 |
| 2008/0262653 | A1 * | 10/2008 | Arakelyan et al. | 700/245 |
| 2009/0032649 | A1 * | 2/2009 | Inoue et al. | 248/49 |
| 2009/0114052 | A1 * | 5/2009 | Haniya et al. | 74/490.03 |
| 2009/0255363 | A1 * | 10/2009 | Nishida et al. | 74/490.07 |
| 2009/0255364 | A1 * | 10/2009 | Nishida et al. | 74/490.07 |
| 2009/0269180 | A1 * | 10/2009 | Wappling et al. | 414/729 |
| 2010/0000364 | A1 * | 1/2010 | Kagawa et al. | 74/490.02 |
| 2010/0005919 | A1 * | 1/2010 | Breu | 74/490.05 |
| 2010/0031767 | A1 * | 2/2010 | Chenu | 74/490.05 |
| 2010/0037721 | A1 * | 2/2010 | Nakao et al. | 74/490.05 |
| 2010/0101358 | A1 * | 4/2010 | Sendai et al. | 74/490.06 |
| 2010/0101359 | A1 * | 4/2010 | Breu et al. | 74/490.06 |
| 2010/0229671 | A1 * | 9/2010 | Haniya et al. | 74/490.02 |
| 2011/0033275 | A1 * | 2/2011 | Lehmann | 414/737 |
| 2011/0097184 | A1 * | 4/2011 | Kinoshita et al. | 414/589 |
| 2011/0120254 | A1 * | 5/2011 | Zhang et al. | 74/490.04 |
| 2011/0291433 | A1 * | 12/2011 | Feng | 294/65 |
| 2012/0042628 | A1 * | 2/2012 | Rosheim | 60/232 |
| 2012/0111135 | A1 * | 5/2012 | Ichibangase et al. | 74/490.06 |

FOREIGN PATENT DOCUMENTS

| | | |
|---|---|---|
| JP | 5840289 | 3/1983 |
| JP | 6069317 A | 3/1994 |
| JP | 6508303 | 9/1994 |

* cited by examiner

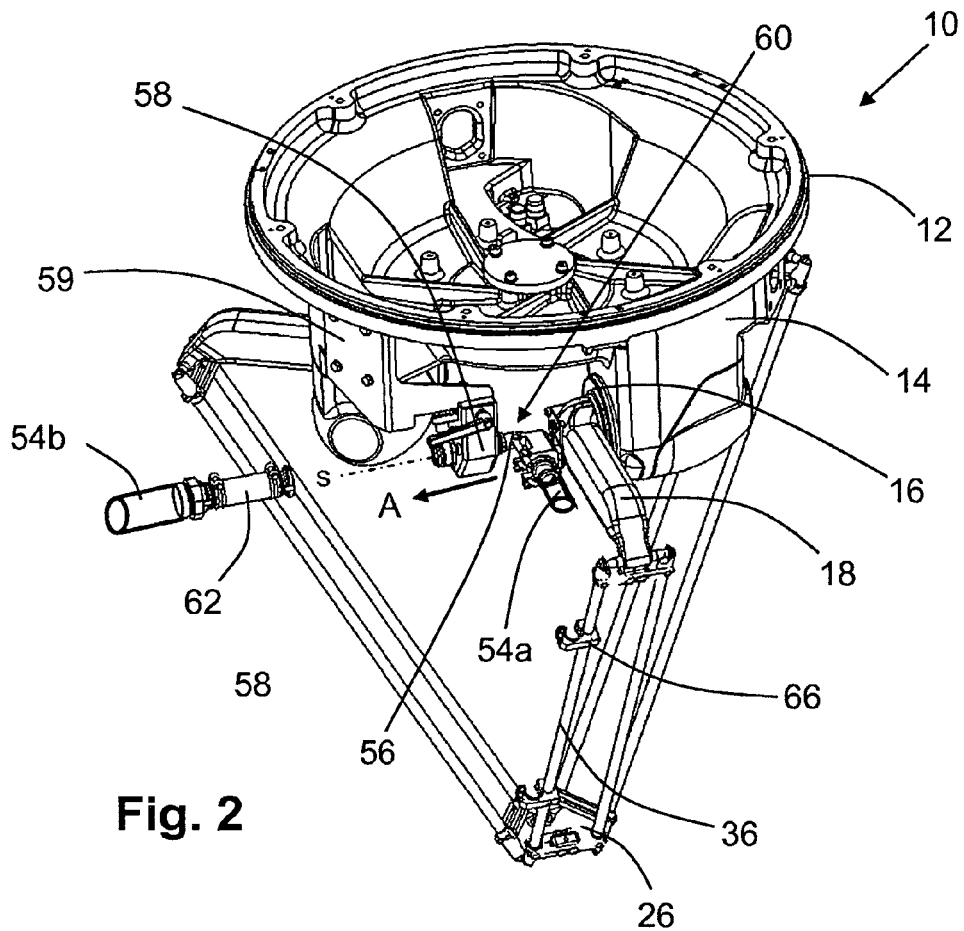
Fig. 2
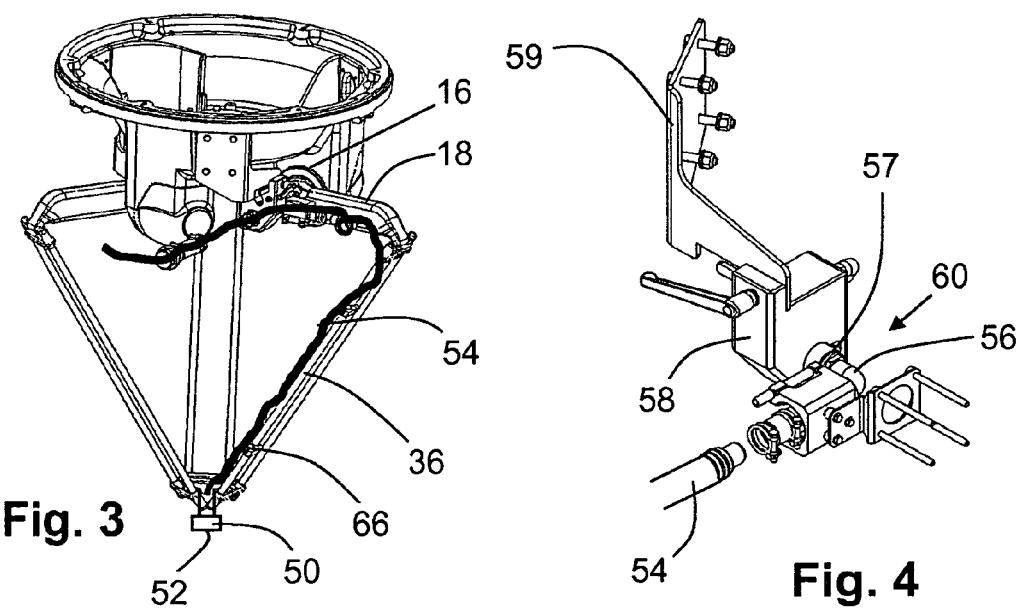
Fig. 3
Fig. 4

DEVICE FOR MOVING AND POSITIONING AN OBJECT IN SPACE

CROSS-REFERENCE TO RELATED APPLICATION

This application is a 35 USC 371 application of PCT/EP2009/053854 filed on Apr. 1, 2009.

BACKGROUND OF THE INVENTION

1. Field of the Invention

The invention relates to a device for moving and positioning an object in space, having at least three actuation arms, each connected to one motor-drive unit and pivotable about a motor/drive axis, wherein, for gripping the object by suction, the free end of the actuation arm is pivotably connected via vacuum rods to a support element having at least one gripping means, connectable to a vacuum source via a vacuum hose. The device for moving and positioning an object in space is a device known in the professional world as a robot with parallel kinematics, also known by the term "delta robot".

2. Description of the Prior Art

In delta robots, the hose guidance from the gripping tool to the vacuum supply is conventionally done via the vacuum rods and via a freely suspended piece of hose about 1500 mm long. This self-supporting hose on the one hand requires stability, so as to be suspended in self-supporting fashion in space, and on the other flexibility, to ensure the extreme motions of the robot. The hose is stressed by both torsion and flexion and can begin to vibrate. If the robot and the hose move in opposite directions, a jerk can occur that not only impairs the precision of the robot but also puts a heavy load on the hose. For that reason, the hose is exposed to high wear and must therefore be replaced after only a short time.

OBJECTS AND SUMMARY OF THE INVENTION

The object of the invention is to propose a hose guide for a device of the type known at the outset which has less vulnerability to wear than the hose guide, known from the prior art, with the self-supporting hose.

To attain this object according to the invention, the vacuum hose is guided by the support element toward the motor/drive axis of one of the motor-drive units and is connectable to the vacuum source via a hose joint that is disposed essentially in the motor/drive axis and is rotatable about the motor/drive axis.

The torsion of the hose is released by a rotatable coupling part. Since a delta robot has only a purely rotational motion in the motor/drive axis of the actuation arms, this coupling part is placed in the axis of rotation of one of the actuation arm drives. Thus the hose has to compensate only for the angular motions between the actuation arm and the vacuum rods and the angular motions of the support element, which now causes only slight bending moments in the hose. Thus the hose can be guided closely on the actuation arm and on the vacuum rods.

Since the actuation arm moves, the hose is shifted farther in the direction of the motor axis. At the end of the actuation arm, the hose is provided with an angle piece that forms the rotatable part of a "hose joint". The axis of rotation is located virtually in the motor/drive axis of the actuation arm.

Preferably, the vacuum hose is guided along the vacuum rods and actuation arms and is detachably fixed by means of fastening elements.

The fastening element on the actuation arm is preferably mounted in vibration-damping and play-compensating fashion.

So that the rotatable hose joint can be shifted quickly and without a tool, it is preferably equipped with a fast-action closure, in particular a bulkhead stuffing box or a bayonet mount.

The hose guide according to the invention, compared to the former version with the self-supporting hose, has the following advantages:

- Fast removal of the hoses for cleaning
- The hoses are less stressed because of the release of the torsion, and softer hoses can be used; the service life is extended
- Greater safety from better-controlled hose guidance
- Greater precision from lesser interfering forces on the robot
- Vibration of the hoses is avoided.

BRIEF DESCRIPTION OF THE DRAWINGS

Further advantages, characteristics of details of the invention will become apparent from the ensuing description of preferred exemplary embodiments and from the drawings, in which:

FIG. 2 shows an oblique view on a delta robot equipped with elements for the hose guidance according to the invention;

FIG. 3 shows the principle of laying hose in the delta robot of FIG. 2;

FIGS. 4-6 show oblique views on the hose joint assembly of FIG. 2, shown enlarged.

DESCRIPTION OF THE PREFERRED EMBODIMENTS

Figure 1:
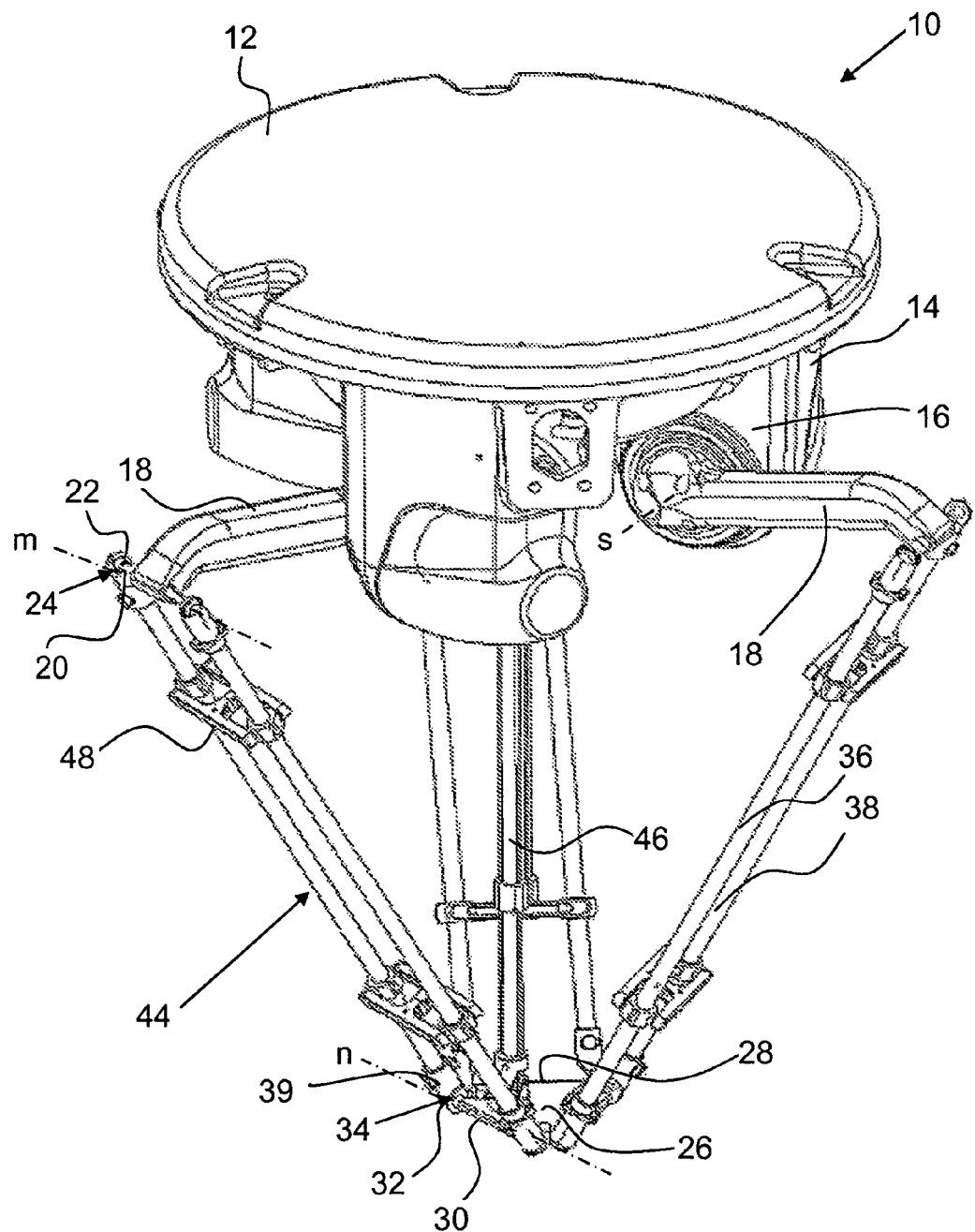
FIG. 1 shows an oblique view on a delta robot.

A delta robot 10 shown in FIG. 1 has a base element 12, with a horizontal mounting plane, and three mounts 14, protruding from the base element 12, each for receiving one motor-drive unit 16. One actuation arm 18, pivotable about the motor/drive axis s, is seated on each gear shaft, defining a motor/drive axis s, of each motor-drive unit 16. The three motor-drive axes s are located in a plane parallel to the mounting plane of the base element 12, and their intersections form the corners of an equilateral triangle. A first joint rod 20, defining a first joint axis m located parallel to the motor/drive axis s, is affixed to the free end of each actuation arm 18. Each first joint rod 20, on each of its two ends, has a first joint part 22 of a respective first ball joint 24. The paired first joint parts 22 are disposed mirror-symmetrically to one another relative to a respective vertical plane, and the three vertical planes intersect in a common vertical axis, forming an axis of symmetry for the disposition of the three motor-drive units 16, and form an angle of 120° each from one another.

A support element 26, equipped essentially as a plate with side edges 28 forming an equilateral triangle, also called a tool holder or platform, is equipped on each of the three side edges 28 with one second joint rod 30, defining a second joint axis n. Each second joint rod 30, on each of its two ends, has a first joint part 32 of a respective second ball joint 34. The paired first joint parts 32 of each second joint rod 30 are disposed mirror-symmetrically to one another with respect to an angle bisector of the equilateral triangle that characterizes the support element 26.

The spacing between the first joint parts 22 on the free end of each actuation arm 18 is identical to the spacing between the first joint parts 32 on the side edges 28 of the support element 26.

One side edge 28 of the support element 26 is associated with each actuation arm 18. Each pair of identically embodied vacuum rods 36, 38, also called parallel bars, have an end piece 39 on each of their ends, each end piece having a second joint part 40, 42. Each second joint part 40, 42, with a first joint part 22, 32 on the free end of the actuation arm 18 and on the side edge 28 of the support element 26, respectively, forms a corresponding first and second ball joint 24, 34, respectively.

At a short spacing from the first and second ball joints 24, 34, the two vacuum rods 36, 38 are connected to one another via a prestressing element 48, located essentially parallel to the joint axes m, n.

The first joint parts 22, 32 on the free end of the actuation arm 18 and on the side edge 28 of the support element 26, respectively, are equipped as balls, while the second joint parts 40, 42 on the end pieces 39 of the vacuum rods 36, 38 are embodied as sockets, of ball-and-socket joints.

The two vacuum rods 36, 38, which are of equal length, together with the two joint rods 20, 30, also of equal length, form a set of parallel bars 44, with one ball joint 24, 34 at each corner of the parallelogram. The connection of the actuation arms 18 to the support element 26 via one set of parallel bars 44 each prevents the rotation of the support element 26 about axes in all three dimensions in space. The support element 26 can accordingly move only parallel to itself in reaction to a motion of the actuation arms 18. The controlled pivoting motion of the actuation arms 18 about their motor-drive axes s is accordingly converted into a linear motion of the support element 26.

The support element 26 is connected to the base element 12 via a central shaft 46 for transmitting torques that is telescopically adjustable in its length. The central shaft 46 is affixed to the support element 26 via a cardan joint. On its end opposite from the support element 26, the central shaft 46 is connected to a drive shaft of a servo motor, not shown in the drawing. Via the central shaft 46, a rotation of the support element 26 in the three-dimensional space can be generated.

Figure 5:
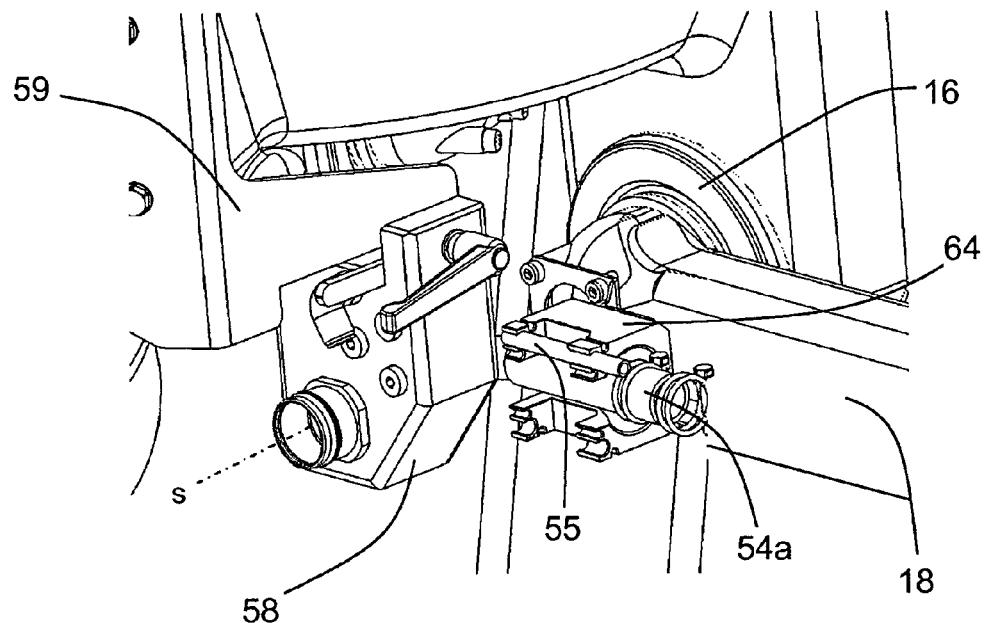
Figure 6:
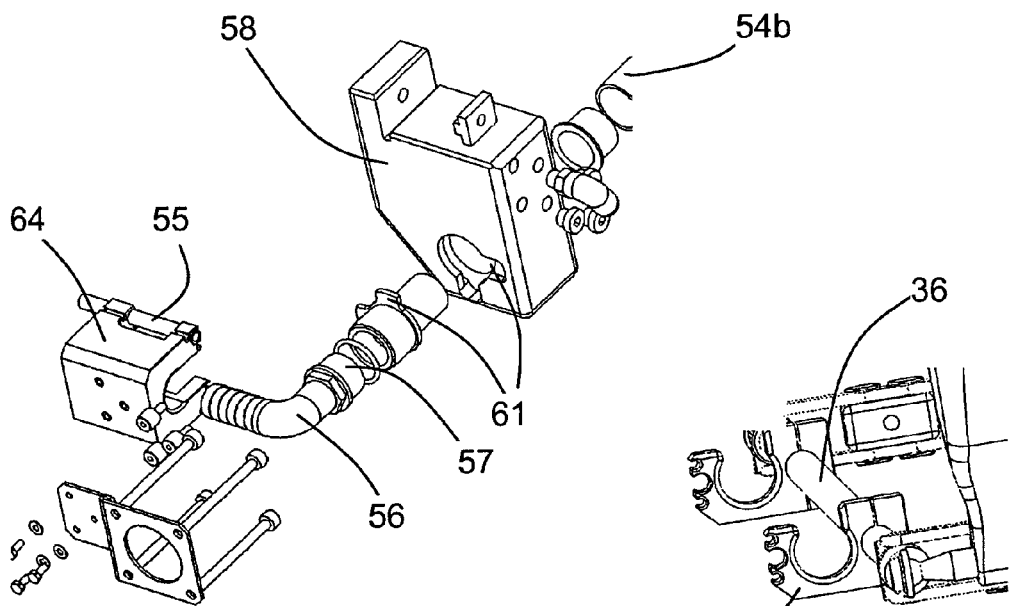
Figure 7:
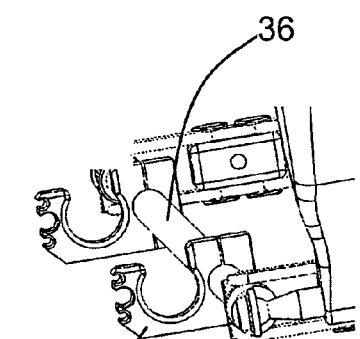
FIG. 7 shows an oblique view on a hose fastening on a connecting arm of FIG. 2, shown enlarged.

As can be seen from FIG. 3, a downward-projecting gripper element 50 is mounted on the support element 26, with an intake opening 52 for gripping an object by suction. A vacuum hose 54, 54a, 54b connecting the intake opening 52 to a vacuum source, not shown in the drawing, is affixed detachably to the gripper element 50. The vacuum hose 54, 54a, 54b is guided upward along a vacuum rod 36 and is fixed detachably to the vacuum rod 36 in hose holders 66. These hose holders 66 can additionally be embodied for receiving pneumatic hoses 55 as shown in FIGS. 5 and 6.

In a hose guide according to the prior art, the vacuum hose 54, 54a, 54b is connected to the vacuum source, not shown in the drawing, at the upper end of the vacuum rod 36 via a freely suspended piece of hose that is approximately 50 cm long.

As shown in FIGS. 2-7, the vacuum hose 54, 54a, 54b, in a hose guide according to the invention, is guided from the upper end of the vacuum rod 36 along the actuation arm 18 toward the motor/drive axis s and changes over into an angle piece 56. The free end of the angle piece 56 is located in the motor/drive axis s and can be inserted, as a rotatable joint part 57 of a hose joint 60, into a coupling and bearing part 58 secured detachably to the base element 12 of the robot 10 via a fast-action closure. This stationary coupling and bearing part 58 communicates with a vacuum source, not shown in the drawings, via vacuum hose 54b, which is detachably connectable to the coupling and bearing part 58 via a coupling piece 62.

Thus the hose joint 60 comprises the stationary coupling and bearing part 58, which is secured by a fast-action closure to a mounting plate 59 affixed to the base element 12 of the robot 10, and the movable angle piece 56 leading to the actuation arm 18.

The complete hose joint 60 can be mounted as shown in FIG. 2 in the direction of the arrow A. The hoses are snapped out and can thus be replaced or cleaned. The same is true for both the vacuum hose 54 and the pneumatic hoses 55.

The angle piece 56 is detachably latched into a crank 64 mounted easily movably on the actuation arm 18 via rubber dampers. This crank 64 on the one hand transmits the requisite torque from the actuation arm 18 to the hose joint 60 and the hose 54, 54a, but at the same time can compensate for slight axial tolerances in position and alignment between the axis of rotation of the hose joint and the motor/drive axis s of the actuation arm 18. Moreover, this crank 64 has a vibration-damping effect. The crank 64 can additionally be embodied for receiving pneumatic hoses 55.

The rotatable joint part 57 can be connected to the coupling and bearing part 58 by means of a bulkhead stuffing box 61 or bayonet mount and can be removed in a simple way. For that purpose, the hose 54, 54a, along with the angle piece 56, is pulled, out of the snap connections, and the hose joint is rotated toward the rear, so that the bulkhead stuffing box 61 releases the joint.

Moreover, all the hoses can be replaced via click systems.

The construction is embodied as a "wipe" and "washdown" construction. The construction is developed hydraulically such that there are no mechanical components in the air flow, so that optimal cleaning is ensured.

Pneumatic hoses 55 can additionally be guided along the vacuum hose 54—for instance for operating valves. Since these pneumatic hoses have only small diameters and high flexibility, it is unnecessary to disconnect them by means of a rotary joint. Instead, without any drawback, these hoses can be guided onto the actuation arm by means of a sufficiently long self-supporting piece of hose.

The foregoing relates to the preferred exemplary embodiments of the invention, it being understood that other variants and embodiments thereof are possible within the spirit and scope of the invention, the latter being defined by the appended claims.

The invention claimed is:

1. A device for moving and positioning an object in space, comprising:
   at least three actuation arms, each connected to a respective motor-drive unit and pivotable about a motor/drive axis, wherein, for gripping the object by suction, a free end of each of the actuation arms is pivotably connected via vacuum rods to a support element having at least one gripping device connectable to a vacuum source via a vacuum hose, the vacuum hose being guided from the support element toward the motor/drive axis of one of the respective motor-drive units and being connected to the vacuum source via a rotatable hose joint that is disposed essentially along the motor/drive axis and is rotatable about the motor/drive axis.

2. The device as defined by claim 1, wherein the vacuum hose is guided along the vacuum rods and the actuation arms and is detachably fixed by fastening elements.

3. The device as defined by claim 2, wherein the fastening elements are mounted on the actuation arms in a vibration-damping and play-compensating fashion.

4. The device as defined by claim 1, wherein the rotatable hose joint is equipped with a fast-action closure.

5. The device as defined by claim 2, wherein the rotatable hose joint is equipped with a fast-action closure.

6. The device as defined by claim 3, wherein the rotatable hose joint is equipped with a fast-action closure.

7. The device as defined by claim 4, wherein the rotatable hose joint is equipped with a bulkhead stuffing box or a bayonet mount.

8. The device as defined by claim 1, wherein the rotatable hose joint includes an angle piece, one end of which is located in the motor/drive axis and is rotatably insertable into a coupling and bearing part secured detachably to a base element of the device.

* * * * *